US011818820B2

(12) United States Patent
Meerbeek et al.

(10) Patent No.: US 11,818,820 B2
(45) Date of Patent: Nov. 14, 2023

(54) ADAPTING A LIGHTING CONTROL INTERFACE BASED ON AN ANALYSIS OF CONVERSATIONAL INPUT

(71) Applicant: SIGNIFY HOLDING B.V., Eindhoven (NL)

(72) Inventors: Berent Willem Meerbeek, Veldhoven (NL); Bartel Marinus Van De Sluis, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 66 days.

(21) Appl. No.: 17/291,440

(22) PCT Filed: Nov. 4, 2019

(86) PCT No.: PCT/EP2019/080032

§ 371 (c)(1),
(2) Date: May 5, 2021

(87) PCT Pub. No.: WO2020/094536

PCT Pub. Date: May 14, 2020

(65) Prior Publication Data

US 2022/0007484 A1 Jan. 6, 2022

(30) Foreign Application Priority Data

Nov. 5, 2018 (EP) .................................... 18204232

(51) Int. Cl.

*H05B 47/10* (2020.01)
*H05B 47/12* (2020.01)
(Continued)

(52) U.S. Cl.

CPC .............. *H05B 47/12* (2020.01); *G10L 15/22* (2013.01); *H04L 12/282* (2013.01);
(Continued)

(58) Field of Classification Search

CPC .... H05B 47/12; H05B 47/105; H05B 47/125; H05B 47/155; H05B 47/165; H05B 47/175

See application file for complete search history.

(56) References Cited

U.S. PATENT DOCUMENTS 9,137,878 B2 9/2015 Thompson
9,635,740 B2 4/2017 Sun et al.
(Continued)

FOREIGN PATENT DOCUMENTS

WO 2018027507 A1 2/2018

*Primary Examiner* — Tung X Le

(57) ABSTRACT

A system (1) for adapting a lighting control interface is configured to receive a signal indicative of conversational input from a user, analyze the conversational input, determine an activity and a location (14) based on the analysis, select a stored activity matching the activity from a plurality of activities stored in a memory, each of the plurality of activities being associated with a light setting in the memory, obtain a light setting associated with the selected activity from the memory, identify a light device (24) at the location based on the determined location, and adapt a lighting control interface (27) to allow the light device at the location to be controlled according to the determined light setting in response to receiving an input via the lighting control interface.

14 Claims, 4 Drawing Sheets

(51) Int. Cl.
*H05B 47/175* (2020.01)
*G10L 15/22* (2006.01)
*H04L 12/28* (2006.01)

(52) U.S. Cl.
CPC ....... *H04L 12/2829* (2013.01); *H05B 47/175* (2020.01); *G10L 2015/223* (2013.01)

(56) References Cited

U.S. PATENT DOCUMENTS

| | | | | |
|---|---|---|---|---|
| 9,795,004 | B2* | 10/2017 | Blum | H05B 47/11 |
| 11,172,564 | B2* | 11/2021 | Slupik | H05B 47/19 |
| 2006/0170376 | A1* | 8/2006 | Piepgras | H05B 47/105 315/295 |
| 2009/0085500 | A1* | 4/2009 | Zampini, II | H05B 45/00 315/297 |
| 2013/0093329 | A1 | 4/2013 | Shin | |
| 2014/0354160 | A1* | 12/2014 | Aggarwal | H05B 47/12 315/312 |
| 2015/0084518 | A1 | 3/2015 | Takahashi | |
| 2018/0092189 | A1* | 3/2018 | Reier | G10L 15/30 |
| 2018/0116040 | A1* | 4/2018 | Mann | G08C 17/02 |
| 2018/0249435 | A1* | 8/2018 | Yu | H04W 4/80 |

* cited by examiner

ADAPTING A LIGHTING CONTROL INTERFACE BASED ON AN ANALYSIS OF CONVERSATIONAL INPUT

CROSS-REFERENCE TO PRIOR APPLICATIONS

This application is the U.S. National Phase application under 35 U.S.C. § 371 of International Application No. PCT/EP2019/080032, filed on Nov. 4, 2019, which claims the benefit of European Patent Application No. 18204232.5, filed on Nov. 5, 2018. These applications are hereby incorporated by reference herein.

FIELD OF THE INVENTION

The invention relates to a system for adapting a lighting control interface.

The invention further relates to a method of adapting a lighting control interface.

The invention also relates to a computer program product enabling a computer system to perform such a method.

BACKGROUND OF THE INVENTION

In recent years, there has been a maturing of speech recognition technology resulting in an increasing adoption of Smart Home Voice assistants in the home, for example Siri, Alexa, Cortana, and Google Home.

Although it is getting more common to use voice for controlling the smart home, giving explicit voice command can still be cumbersome for consumers. First, they are not always conscious about their lighting needs or changes in their lighting needs, so they do not get a trigger to change the light with an explicit voice command. Second, since most voice interfaces still require a specific vocabulary, syntax, and set of commands, consumers do not always know which commands to give. These solutions typically have a high cognitive load, as people need to memorize and verbalize the voice commands.

U.S. Pat. No. 9,137,878 B2 discloses dynamic lighting techniques that consider activity within a given area so as to provide lighting to that area with a high degree of context awareness. The techniques consider physical activity and emotional activity within that area. A microphone can be used to capture, for instance, voice commands for specific lighting requests, emotional indicators such as laughter, crying, anger-based yelling, and any other sounds that may be useful in assessing what an appropriate lighting scheme might be (e.g., snoring, dog barking, door bell ringing, etc.). Emotional activities such as, for instance, raised voice indicating anger, sighs, crying, laughter, raised eyebrows, and stress or panic as indicated by running can also be taken into consideration to provide a deeper and more personal insight into the lighting experience.

Voice input can also be used to control lighting without requiring users to verbalize voice commands. U.S. Pat. No. 9,795,004 B2 discloses a lighting device configured to control one or more parameters of light output, such as ON/OFF status, intensity when ON, color characteristics and position or orientation of light output. In an embodiment, the lighting device has a human/machine user interface which include passive sensing, e.g. utilizing intentional and/or unintentional, direct and/or indirect sensed user input as part of a determination related to the user. For example, voice recognition may be used to sense frustration in a user's voice during a conversation between two occupants of a space. In response, the lighting device may be adjusted, e.g. by lowering the intensity and/or changing the color of the illumination of the room or other spaced occupied by the agitated parties.

However, controlling light based on an emotional state of users only works in a limited number of situations. In most situations, voice commands still need to be verbalized.

SUMMARY OF THE INVENTION

It is a first object of the invention to provide an improved system for enabling lighting to be controlled.

It is a second object of the invention to provide an improved method for enabling lighting to be controlled.

In a first aspect of the invention, a system for adapting a lighting control interface comprises at least one input interface, at least one output interface, and at least one processor configured to use said at least one input interface to receive a signal indicative of conversational input from a user, analyze said conversational input, determine an activity and a location based on said analysis, select a stored activity matching said activity from a plurality of activities stored in a memory, each of said plurality of activities being associated with a light setting in said memory, obtain a light setting associated with said selected activity from said memory, identify a light device at said location based on said determined location, and use said at least one output interface to adapt a lighting control interface to allow said light device at said location to be controlled according to said determined light setting in response to receiving an input via said lighting control interface.

By determining from a conversational input signal, e.g. a signal indicative of a conversation between humans or between a human and system, what activity the user intends to perform and at which location, a suitable light setting may be determined based on the determined activity, and this light setting may then be activated when the user arrives at the determined location. This may be realized, for example, by programming a light switch in the determined location to activate this light setting when the light switch is switched to an ON state. The resulting system is therefore an improvement over the system described in U.S. Pat. No. 9,795,004 B2.

Said system may be part of a lighting system which further comprises said light device. Said signal indicative of said conversational input may comprise an audio signal or text, for example. Said determined location may be different than a location of said user when said signal indicative of said conversational input is received. Said lighting control interface may comprise a light switch, a user interface displayed on a display of a mobile device, a timer and/or a presence sensor, which are able to control said light device. For example, the presence sensor may comprise a heat or motion sensor, e.g. a PIR sensor, and/or may detect presence by analyzing reflected signals (e.g. radar), by analyzing disturbances in RF signals between a transmitter and a receiver (also referred to as RF-based sensing) and/or by detecting RF beacons (e.g. BLE beacons) transmitted by devices carried by persons (also referred to as RF-based asset tracking). Said at least one processor may be configured to determine said location from said activity. This is beneficial if the user does not mention the location itself in his conversation, for example. For example, if a user mentions that he is going to cook, but he does not mention that he going to cook in the kitchen, the location may still be determined to be the kitchen, but now from the word "cook".

Said at least one processor may be configured to allow said light setting to be controlled according to said determined light setting upon receiving input indicative of expiry of a timer. For example, when a user mentions that he needs to get up at 7 am the next morning, the light device in his bed room may be identified and programmed to activate a wakeup light scene at 7 am the next morning.

Said lighting control interface may comprise a light switch. For example, when the user mentions that he is going to cook, the light switch in the kitchen may be programmed to activate a cooking light scene when the light switch is switched to an ON state.

Said at least one processor may be configured to adapt said lighting control interface upon determining that said user is present at said location. This may be beneficial if said system comprises a mobile device, for example. In this case, said at least one output interface may comprise a display of said mobile device and said lighting control interface may comprise a user interface displayed on said display of said mobile device. For example, a virtual light switch may be represented in the user interface and whether this light switch triggers a light scene and/or which light scene this light scene triggers may depend on the location of the mobile device of the user, i.e. the location that the user is in.

Additionally or alternatively, said at least one output interface may comprise a transmitter for transmitting a request to adapt said lighting control interface to a device comprising said lighting control interface. This is beneficial if the processor and the lighting control interface are not part of the same device, e.g. if the at least one processor is part of a mobile device and the lighting control interface is a physical light switch.

Said at least one processor may be configured to adapt said lighting control interface to allow said light device to be controlled according to said determined light setting upon receiving input indicating that a presence sensor has detected presence in said location. As a first example, if the user mentions that he is going to cook, the light in the kitchen may be set to a cooking light scene as soon as the presence of the user is detected in the kitchen. As a second example, if the user mentions that he is going to get the salt, the light in the kitchen may be set to a bright scene as soon as the presence of the user is detected in the kitchen.

Said at least one processor may be configured to identify said user while receiving said signal indicative of said conversational input and adapt said lighting control interface to allow said light device to be controlled according to said determined light setting in response to said presence sensor detecting presence of said user in said location. For example, the presence sensor may detect the presence of a specific user if it detects motion as well as receives a transmission by the user's mobile phone (e.g. of the user's identity). This makes it possible to prevent that a cooking light scene is activated upon detecting a first user, while it was a second user that mentioned that was going to cook and this second user is not at home yet.

Said at least one processor may be configured to determine a plurality of candidate locations based on said signal indicative of said conversational input and select said location from said plurality of candidate locations based on an identity of said user, a location of said user when said signal indicative of conversational input was received and/or a history of light setting activations stored in a memory. For example, if a user mentions that is going to bed and there are multiple bed rooms, this allows the correct bed room to be identified.

Said at least one processor may be configured to determine a plurality of candidate activities and associated probabilities based on said signal indicative of said conversational input and select said activity from said plurality of candidate activities based on said associated probabilities. A probabilistic classifier may be used, for example. This allows the uncertainty about which activity the user intends to undertake to be considered explicitly. In case of several candidate activities, multiple activities may be linked to a physical button, for example in order of probability, such that a user can press the ON button again until the right light setting is activated. For an app on a smart device, the selection of widgets or scene icons can be adapted in a similar way. For example, a list of light settings associated to the candidate activities might be presented (ordered on probability).

In a second aspect of the invention, a method of adapting a lighting control interface comprises receiving a signal indicative of conversational input from a user, analyzing said conversational input, determining an activity and a location based on said analysis, selecting a stored activity matching said activity from a plurality of activities stored in a memory, each of said plurality of activities being associated with a light setting, obtaining a light setting associated with said selected activity, identifying a light device at said location based on said determined location, and adapting a lighting control interface to allow said light device at said location to be controlled according to said determined light setting in response to receiving an input via said lighting control interface. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for adapting a lighting control interface.

The executable operations comprise receiving a signal indicative of conversational input from a user, analyzing said conversational input, determining an activity and a location based on said analysis, selecting a stored activity matching said activity from a plurality of activities stored in a memory, each of said plurality of activities being associated with a light setting, obtaining a light setting associated with said selected activity, identifying a light device at said location based on said determined location, and adapting a lighting control interface to allow said light device at said location to be controlled according to said determined light setting in response to receiving an input via said lighting control interface.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
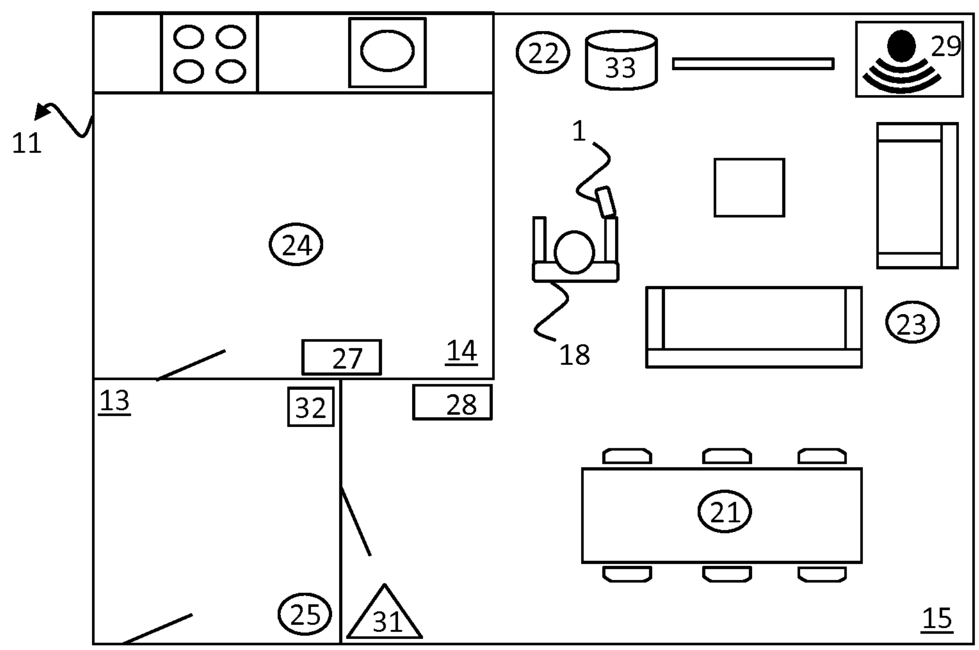
FIG. 1 depicts an example of an environment in which a first embodiment of the system may be used.

FIG. 1 depicts a floor 11 of a home that consist of a hall 13, a kitchen 14 and a living room 15. Five light devices have been installed on floor 11: a light device 24 in the kitchen 14, a light device 25 in the hall 13, and light devices 21-23 in the living room 15. Light device 21 has been installed above a dinner table, light device 22 has been installed to the left of a Television, and light device 23 has been installed next to two couches. The light devices 21-25 may be Philips Hue lights, for example.

Furthermore, a presence sensor device 29 has been installed to the right of the Television, connected programmable light switch device 27 has been installed in the kitchen 14, and connected programmable light switch device 28 has been installed in the living room 15. The light switch devices 27 and 28 may be Philips Hue Tap switches, for example. The light devices 21-25, the light switch devices 27-28 and the presence sensor device 29 are connected wirelessly to a bridge 31, e.g. via ZigBee or a protocol based on ZigBee. The bridge 31 is connected to a wireless access point 32, via a wire or wireless.

In the example depicted in FIG. 1, the invention is implemented in mobile device 1. The mobile device 1 may be a mobile phone or tablet, for example. In this example, a conventional bridge 31 is used. In an alternative embodiment, the mobile device 1 is able to control light devices 21-25 without a bridge. The mobile device 1 is also connected (wirelessly) to the wireless access point 32. The mobile device 1 may further be connected to a base station of a cellular communication network, e.g. an eNodeB of an LTE network. A smart speaker 33 is also present in the living room 15 and is also connected to the wireless access point 32.

Figure 2:
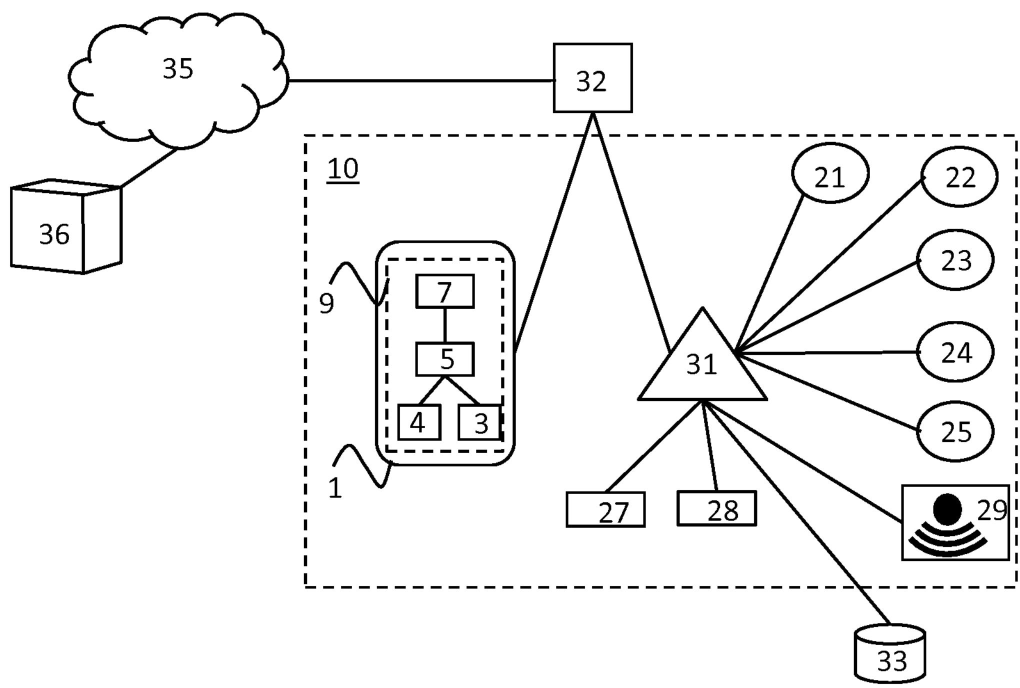
FIG. 2 is a block diagram of the first embodiment of FIG. 1.

A block diagram of mobile device 1 is shown in FIG. 2. The mobile device 1 comprises a receiver 3, a transmitter 4, a processor 5, a memory 7 and a display 9. The mobile device 1, the bridge 31 and the light devices 21-25 are part of lighting system 10. The processor 5 is configured to use the receiver 3 to receive a signal indicative of conversational input from a user, analyze the conversational input, determine an activity and a location based on the analysis, and select a stored activity matching the activity from a plurality of activities stored in the memory 7. Each of the plurality of activities is associated with a light setting in the memory 7.

The processor 5 is further configured to obtain a light setting associated with the selected activity from the memory 7, identify a light device, e.g. one or more of light devices 21-25, at the location based on the determined location, and use the transmitter 4 and/or display 9 to adapt a lighting control interface to allow the light device(s) at the location to be controlled according to the determined light setting in response to receiving an input via the lighting control interface. Input may be user input or sensor input, for example.

In a first implementation, light switch devices 27 and 28 and presence sensor device 29 each comprise a lighting control interface, e.g. one or more buttons and a motion sensor, respectively. The transmitter 4 is used to transmit a request to adapt the lighting control interface to the light switch devices 27 and 28 and the presence sensor device 29.

In the embodiment of FIG. 2, the wireless LAN access point 32 is connected to the Internet (backbone) 35. An Internet server 36 is also connected to the Internet (backbone) 35. The Internet server 36 makes it possible for users of a chat server to exchange chat messages. In the embodiment of FIG. 2, the activities and associated light settings are stored in a memory of the mobile device 1. In an alternative embodiment, the activities and associated light settings are stored in a different memory, e.g. a memory of the Internet server 36. The smart speaker 33 may communicate with Internet server 36 or with a different Internet server.

In a first example scenario, the smart speaker 33 hears the user 18 say to his partner over the phone that he is going to cook. The processor 5 of the mobile device 1 then uses the transmitter 4 to transmit a request to the light switch device 27 in the kitchen 14 to associate its button or one of its buttons with light settings optimized for cooking. When the user enters the kitchen 14 and presses this button on the light switch device 27, the light switch device 27 activates the associated (cooking) light settings on the light device 24.

Next, the user uses the mobile device 1 to send a text message to his partner that dinner is almost ready, and he is going to watch TV until he or she gets home. The processor 5 of the mobile device 1 then uses the transmitter 4 to transmit a request to the presence sensor device 29 in the living room 15 to activate an entertainment mode involving the light devices 22 and 23 when presence is detected. Thus, the lighting control interface of presence sensor device 29 is adapted to allow the light devices 22 and 23 to be controlled according to the determined light setting (i.e. the entertainment mode) upon receiving input indicating that the presence sensor device has detected presence in the living room 15. In this entertainment mode, light effects are rendered which are synchronized to media content being rendered on the TV.

In the embodiment of FIG. 2, the entertainment mode is activated in the above scenario when anyone is detected to be present. In an alternative embodiment, the mobile device 1 includes in its request to the presence sensor device 29 an identifier of the mobile device 1 (which is a personal device and therefore also identifies the user of the mobile device 29 who typed the text message). Furthermore, mobile devices regularly transmit beacons, e.g. Bluetooth beacons, comprising the identifier of the mobile device. When the presence sensor device 29 detect presence in the living room 15, it only activates the entertainment mode, and controls light devices 22 and 23 accordingly, if it has recently received or receives within a certain period of time the device identifier included in the request received from the mobile device 1.

In a second implementation, additionally or alternatively, the bridge 31 comprises a lighting control interface. For example, the light switch devices 27 and 28 and/or the presence sensor device 29 may only provide generic events like "button 1 pressed" or "presence detected" to the bridge 31. The bridge 31 then needs to determine the corresponding light settings, e.g. based on associations between events and light settings stored in its memory.

In the embodiment of the mobile device 1 shown in FIG. 2, the mobile device 1 comprises one processor 5. In an alternative embodiment, the mobile device 1 comprises multiple processors. The processor 5 of the mobile device 1 may be a general-purpose processor, e.g. from Qualcomm or ARM-based, or an application-specific processor. The processor 5 of the mobile device 1 may run an Android or iOS operating system for example. The memory 7 may comprise one or more memory units. The memory 7 may comprise solid-state memory, for example. The memory 7 may be used to store an operating system, applications and application data, for example.

The receiver 3 and the transmitter 4 may use one or more wireless communication technologies such as Wi-Fi (IEEE 802.11) to communicate with the wireless LAN access point 32, for example. In an alternative embodiment, multiple receivers and/or multiple transmitters are used instead of a single receiver and a single transmitter. In the embodiment shown in FIG. 2, a separate receiver and a separate transmitter are used. In an alternative embodiment, the receiver 3 and the transmitter 4 are combined into a transceiver. The display 9 may comprise an LCD or OLED panel, for example. The mobile device 1 may comprise other components typical for a mobile device such as a battery and a power connector. The invention may be implemented using a computer program running on one or more processors.

In the embodiment of FIG. 2, the system of the invention is a mobile device. In an alternative embodiment, the system of the invention is a different device, e.g. a bridge or a wearable device such as a smartwatch, or comprises multiple devices. The system may be a vehicle or may be incorporated in a vehicle.

Figure 3:
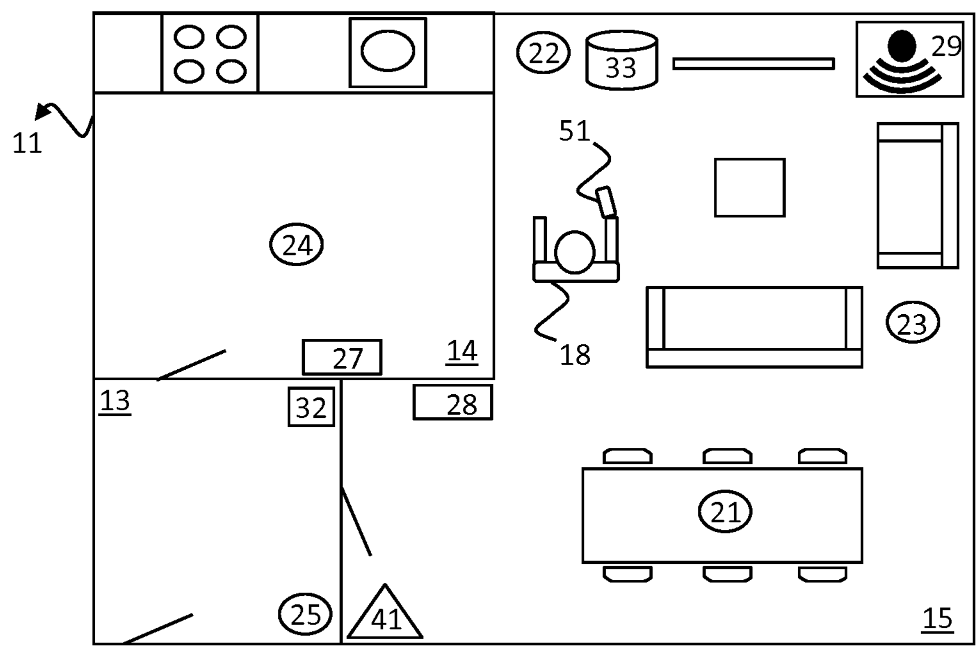
FIG. 3 depicts an example of an environment in which a second embodiment of the system may be used.
Figure 4:
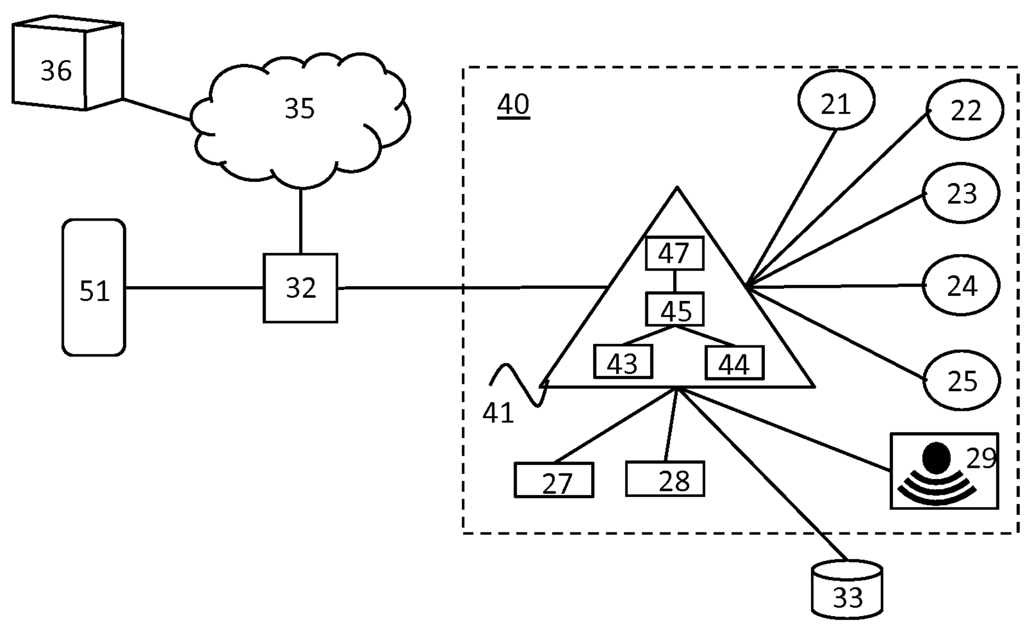
FIG. 4 is a block diagram of the second embodiment of FIG. 3.

In the example depicted in FIG. 3, the invention is implemented in bridge 41. In this example, the user 18 uses a mobile device 51. A block diagram of bridge 41 is shown in FIG. 4. The bridge 41 and the light devices 21-25 are part of lighting system 40. The bridge 41 comprises a receiver 43, a transmitter 44, a processor 45, and a memory 47. The processor 45 is configured to use the receiver 43 to receive a signal indicative of conversational input from a user, analyze the conversational input, determine an activity and a location based on the analysis, and select a stored activity matching the activity from a plurality of activities stored in the memory 47. Each of the plurality of activities is associated with a light setting in the memory 47.

The processor 45 is further configured to obtain a light setting associated with the selected activity from the memory, identify a light device, e.g. one or more of light devices 21-25, at the location based on the determined location, and use the transmitter 44 to adapt a lighting control interface to allow the light device(s) at the location to be controlled according to the determined light setting in response to receiving an input via the lighting control interface.

In the embodiment of the bridge 41 shown in FIG. 4, the bridge 41 comprises one processor 45. In an alternative embodiment, the bridge 41 comprises multiple processors. The processor 45 of the bridge 41 may be a general-purpose processor, e.g. ARM-based, or an application-specific processor. The processor 45 of the bridge 41 may run a Unix-based operating system for example. The memory 47 may comprise one or more memory units. The memory 47 may comprise one or more hard disks and/or solid-state memory, for example. The memory 47 may be used to store a table of connected lights, for example.

The receiver 43 and the transmitter 44 may use one or more wireless communication technologies such as Wi-Fi (IEEE 802.11) to communicate with the wireless LAN access point 32, for example. In an alternative embodiment, multiple receivers and/or multiple transmitters are used instead of a single receiver and a single transmitter. In the embodiment shown in FIG. 4, a separate receiver and a separate transmitter are used. In an alternative embodiment, the receiver 43 and the transmitter 44 are combined into a transceiver. The bridge 41 may comprise other components typical for a network device such as a power connector. The invention may be implemented using a computer program running on one or more processors.

Figure 5:
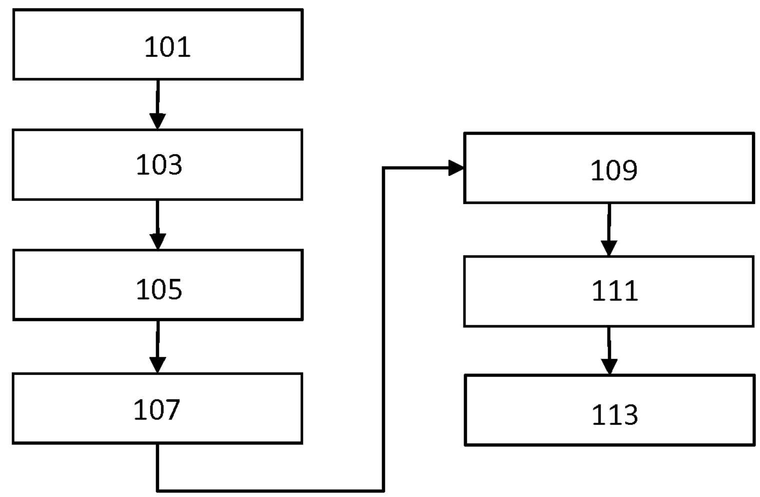
FIG. 5 is a flow diagram of a first embodiment of the method.

A first embodiment of the method is shown in FIG. 5. The method comprises a step 101 of receiving a signal indicative of conversational input from a user. The signal may be received from a smart speaker or an Internet server, for example. A step 103 comprises analyzing the conversational input, e.g. analyzing the received signal. A step 105 comprises determining an activity and a location based on the analysis. If the conversational input does not refer to a location, the location may be determined from the activity. A step 107 comprises selecting a stored activity matching the activity from a plurality of activities stored in a memory. Each of the plurality of activities is associated with a light setting.

A step 109 comprises obtaining a light setting associated with the selected activity. A step 111 comprises identifying a light device at the location based on the determined location. A step 113 comprises adapting a lighting control interface to allow the light device at the location to be controlled according to the determined light setting in response to receiving an input via the lighting control interface. The signal indicative of the conversational input may comprise an audio signal or text, for example.

By applying this method, light control interfaces can automatically be adapted to the context as detected from a conversation. So the light devices are not directly controlled upon detection of an activity associated with a light setting (as this could cause a high number of undesirable changes of the light due to false triggers), but connected lighting control interfaces are adapted based upon the detection of an activity associated with a light setting, such that if users use these control interfaces they more easily get the light setting(s) that fit their needs.

In the embodiment of FIG. 5, step 113 is only performed if the determined location is different than a location of the user at the moment when the signal indicative of the conversational input was received. Steps 107-113 may be skipped in this case as well. For example, no lighting control interface is adapted if the user sends a text message to his partner that he is cooking right now while he is in the kitchen.

Figure 6:
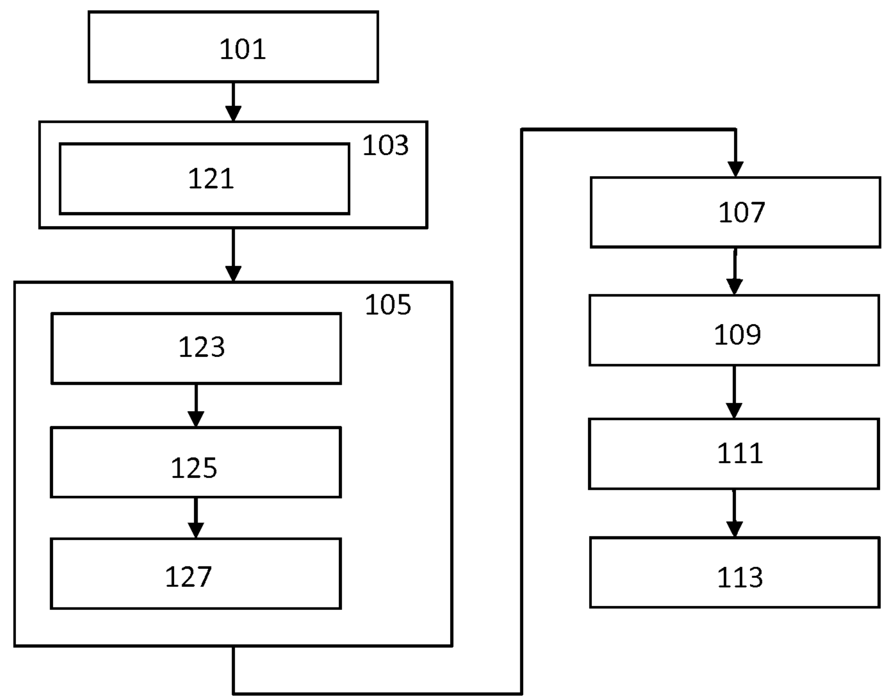
FIG. 6 is a flow diagram of a second embodiment of the method.

A second embodiment of the method is shown in FIG. 6. In step 101, the system receives a signal indicative of a conversation between humans or between a human and a system (e.g. conversational interface/voice assistant). This signal may be a sound signal from a spoken conversation (e.g. with voice assistant or other person in the room) or may comprise a text input from a written conversation (e.g. whatsapp, wechat). There are various connected components that may send this input to the system, for example:

Microphone integrated in lighting devices
Voice assistants (Alexa, Google Home, etc)
Microphone in Smart Device
Video/Audio conferencing equipment
Smartphone Text Application (whatsapp, Wechat, etc.)

Next, step 103 is performed. Step 103 comprises analyzing the conversational input. In the embodiment of FIG. 6, the conversational input is sent in an unprocessed form (e.g. sound signal/audio stream, raw text). The system pre-processes these raw inputs to prepare for analysis and identification of relevant keywords. Typical pre-processing activities include removing noise signals, removing redundant text and stop words, synonym replacement, and converting the input to a computer readable format using Natural Language Understanding (NLU) approaches (rule-based, stochastic). For example, an Automatic Speech Recognition engine (ASR) might recognize the utterance: "Oh, I'm hungry. I'm going to cook dinner now." After pre-processing the internal representation could be: [feeling: hungry][activity: cooking][timing: immediate].

In an alternative embodiment, the conversation input is already processed before it is being received by the system. For example, in case of voice assistants, the raw speech processing may be done by the voice assistant (in the cloud) and only keywords may be shared with the system.

The keywords that are received or that are the result of the above-described local processing are typically stored as a text file in computer readable format (e.g. XML, JSON, wit.ai). This text file is also referred to as the internal representation of the conversation in this description.

The conversational input (i.e. internal representation) is analyzed for keywords relevant for determining an activity, preferably a future activity, and a location, preferably a location at which the future activity will take place. These keywords may be pre-defined by a lighting manufacturer, lighting designer, or lighting application specialist and stored in domain-specific database of lighting related keywords and matching light settings. This may be a fixed databased with associations between keywords and specific light settings or programs, but also a more advanced component that can learn associations between light-related keywords and light settings based on historical analysis of light usage or external information sources. Machine Learning and Topic Modelling techniques (e.g. keyword spotting, TD-IDF, NMF, LDA, etc.) can be applied to the internal representation of the conversation to infer these light-related topics.

Possibly, the set of activities that the system tries to detect is adjusted to the specifics of a user or usage profile (e.g. the name or type of frequently used light scenes, the routines the user has defined) or to the lighting infrastructure the user has (e.g. the lighting device types, rooms where lighting devices are located). For instance, if a user is known to be interested in conforming to his circadian rhythm, the system may try to detect activities related to this. For instance, especially spoken inputs related to the user's fitness, alertness, tiredness or sleepiness may be taken into account.

In the embodiment of FIG. 6, step 103 comprises a sub step 121. Step 121 comprises determining a plurality of candidate activities and associated probabilities based on the signal indicative of the conversational input. When a conversation input is received, classifier algorithms can be used to define with certain probability the specific activities (and optionally associated locations) that are in the received internal representation of the conversation. Very simple classification algorithms (like keyword matching) can be used, as well as more advanced classification algorithms (e.g. SVM, Random Forest, and MLP).

A step 105 comprises determining an activity and a location based on the analysis. In the embodiment of FIG. 6, step 105 comprises sub steps 123, 125 and 127. Step 123 comprises selecting the activity from the plurality of candidate activities based on the associated probabilities. For the example the candidate activity with the highest probability may be selected.

Step 125 comprises determining a plurality of candidate locations based on the signal indicative of the conversational input. General candidate locations (e.g. bedroom, kitchen) may be determined directly from the conversational input, e.g. because a user mentions that he is going to cook in the kitchen or may be determined from the determined activity, e.g. because a user mentions that he is going to cook, which is normally done in the kitchen. The general candidate locations are then mapped to specific candidate locations. For example, if a user has defined three bedrooms in his lighting system/application, a determination of "bedroom" as general candidate location will result in the determination of the three bedrooms as specific candidate locations.

Step 127 comprises selecting the location from the plurality of candidate locations based on an identity of the user, a location of the user when the signal indicative of conversational input was received and/or a history of light setting activations stored in a memory. For example, if the user mentions that needs to wake up at 7 am tomorrow, his bedroom may be identified by determining the user's identity and looking up with which (bed)room this identity has been associated or by determining in which of the bedrooms this user activates a light regularly or by determining which bedroom is closest to the room the user is currently in.

Step 125 may comprise determining probabilities for each of the specific candidate locations based on the identity of the user, the location of the user when the signal indicative of conversational input was received and/or the history of light setting activations, and step 127 may comprise selecting the specific candidate location with the highest probability, for example.

Next, steps 107, 109, 111 and 113 are performed. Step 107 comprises selecting a stored activity matching the activity from a plurality of activities stored in a memory. Each of the plurality of activities is associated with a light setting. Step 109 comprises obtaining a light setting associated with the selected activity. For example, if a person has the intention to cook, he needs bright functional light, while if he is going to have dinner he needs a more dim and cozy light setting.

Step 111 comprises identifying a light device at the location based on the determined location. In a simple implementation, a user manually associates with light devices with rooms and selects a type of room from a plurality of types or gives the room a name which comprises a recognized room type, e.g. kitchen, hall, living room or bedroom. In a simple implementation, the user also manually associates presence sensor devices and/or light switch devices with one or more specific light devices.

Step 113 comprises adapting a lighting control interface to allow the light device at the location to be controlled according to the determined light setting in response to receiving an input via the lighting control interface. This light control interface is identified based on the determined location, e.g. by using the manual associations described in relation to step 111. Examples of such lighting control interfaces are:

an app on a smart device
a light switch
a remote control
a motion sensor

These lighting control interfaces typically provide various option for users to choose from. The light switch may be a separate (connected) light switch or a light switch which is part of a lighting device (e.g. as part of a desk lamp or another lamp type which is typically within the user's reach), for example. The user interface is adapted such that the most likely preferred light setting (based on the determined activity) is most easy to select. As a first example, for a hue dimmer switch, this light setting is linked to the ON button such that this setting is activated as soon as a user presses this button.

As a second example, if the user mentions that needs to wake up at 7 am tomorrow, after the correct (or assumed to be correct) bedroom has been identified, a light device in this bedroom may be programmed to control the determined light setting (e.g. a wake-up scene) upon receiving input indicative of expiry of a timer. This timer may be part of the light device or part of another device.

In a third example, the lighting control interface is a user interface displayed using an output interface of a mobile device, e.g. on display 9 of mobile device 1 of FIG. 2. The lighting control interface is adapted upon determining that the user is present at the determined location. The current location of the mobile device may be determined using RF beacons, for example. The mobile device may be calibrated in order to learn which locations correspond to which room, for example. An example of such a user interface is provided in FIG. 7.

Figure 7:
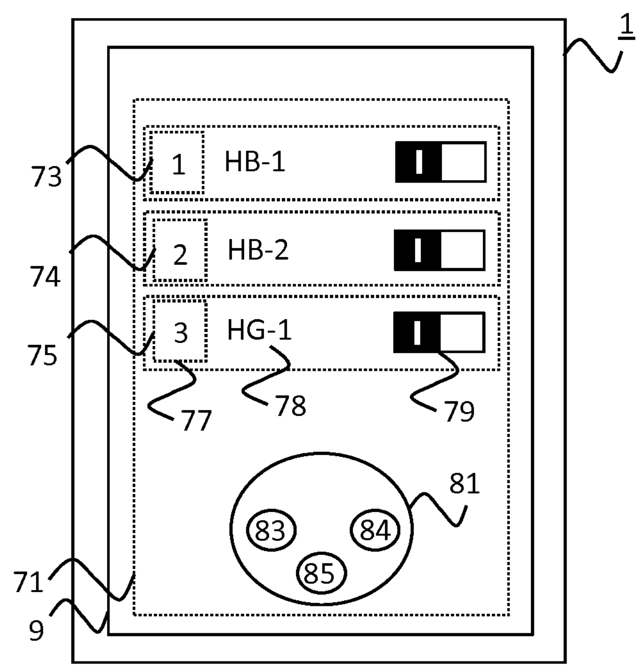
FIG. 7 shows an example of a user interface for using a virtual light switch.

The user interface 71 of FIG. 7 lists three light devices 73-75 named "Hue Bloom-1", "Hue Bloom-2" and "Hue Go-1", respectively. For each of the light devices 73-73, an icon 77, a name 78 and a virtual light switch 79 is shown. A light device can be turned on or off using the virtual light switch 79. The user interface 71 further shows a virtual light switch device 81 (e.g. a virtual Hue tap) with three buttons (light switches) 83-85. Which light setting is triggered by the buttons 83-85 depends on the current location of the mobile device 1.

One or two of the buttons 83-85 may be programmed to have a light setting associated with it that only depends on the current location and does not depend on conversational input e.g. a default scene for the kitchen and a default scene for the living room. The other button(s) are associated with one or more light settings that depend both on the location and the conversational input.

For example, if the user mentions that he is going to cook, button 85 may be programmed temporarily to be associated with a cooking light scene and with the kitchen. When the mobile device 1 is in the kitchen, pressing the button 85 will activate the cooking light scene on one or more light devices in the kitchen, e.g. light device 24 of FIG. 1. A button may be given a different appearance when the current location of the mobile device has resulted in a light setting being associated with the button than when the current location of the mobile device has resulted in no light setting being associated with the button.

In case of several candidate activities, multiple activities may be linked to a physical button, for example in order of probability, such that a user can press the ON button again until the right light setting is activated. For an app on a smart device, the selection of widgets or scene icons can be adapted in a similar way. For example, a list of light settings associated to the candidate activities might be presented (ordered on probability). An activity might also be associated with certain attributes like an expiration interval. The use of an expiration interval means that the adaptation of the lighting control interface is only for a predetermined period after which the interface reverts to the previous state.

In a first example use case, John has a new Philips Hue (smart) luminaire with integrated microphone. As he enters the room, the microphone starts recording sounds from the environment. When his wife says: "I'm hungry, you too?", John responds by saying: "Yes! I'm going to cook". The conversional input is then analyzed, and an activity associated with a light setting is determined: <cooking>. A matching light scene of bright and functional light is now configured and associated with the light switch or the motion sensor in his kitchen. As soon as John enters the kitchen and hits the light switch or is detected by the sensor, light is activated that is suitable for cooking. Besides being able to detect an activity associated with a light setting, the system is also able to determine where this activity (typically) will take place and determine the room or set of lighting devices at that location.

In a second example use case, Ann is talking to her voice assistant and asks whether she has a recommendation for a movie. The voice assistant responds by saying "Sure, I would recommend 'Bad Moms'". Ann then replies: "Sounds great! Put it on!". The activity <watch movie> is then shared with the system, including the movie title as parameter. As the activity <watch movie> has been associated with one or more light settings, both the dimmer switch in Ann's entertainment room and the widget in her smartphone app are re-configured and upon using the dimmer switch and the widget, they activate the associated light settings, which are suitable for movie watching. Since the associated activity <watch movie> has been associated with the entertainment mode of the app running on the mobile device, the app plays the light script that was made for this blockbuster.

Figure 8:
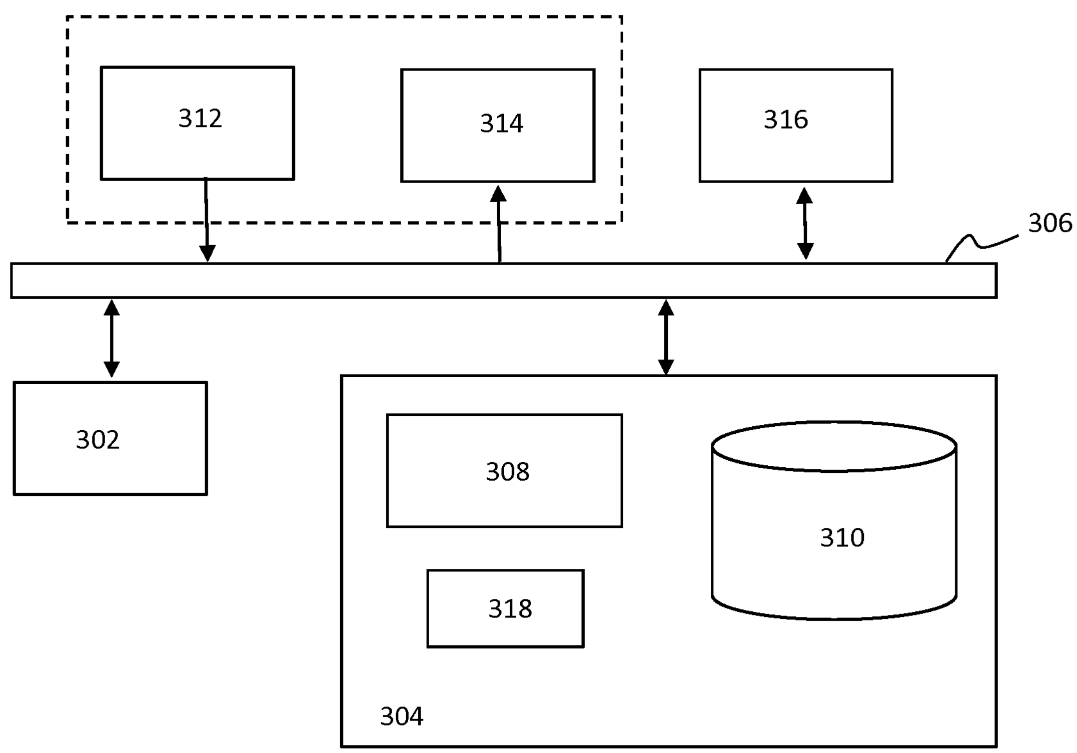
FIG. 8 is a block diagram of an exemplary data processing system for performing the method of the invention.

FIG. 8 depicts a block diagram illustrating an exemplary data processing system that may perform the method as described with reference to FIGS. 5 and 6.

As shown in FIG. 8, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 8 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 8, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 8) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for adapting a lighting control interface in an environment, the system comprising:

at least one input interface in the environment and configured to receive a signal indicative of conversational input from a user;

at least one output interface in the environment and configured to control the lighting control interface; and at least one processor in the environment and configured to receive from the at least one input interface the signal indicative of conversational input from the user, to analyze the conversational input, to determine an activity and a location based on the analysis, to determine the location at least in part from the activity, to select a stored activity matching the activity from a plurality of activities stored in a memory, each of the plurality of activities being associated with a light setting in the memory, to obtain a light setting associated with the selected activity from the memory, to identify a light device at the determined location, and to use the at least one output interface to control the light device through the lighting control interface;

wherein the light device at the location is controlled according to the determined light setting in response to receiving an input via the lighting control interface; and wherein the input is a user input or a sensor input, and the at least one output interface comprises a transmitter for transmitting a request to adapt the lighting control interface to an interface device comprising the lighting control interface.

2. The system as claimed in claim 1, wherein the determined location is different than a location of the user when the signal indicative of the conversational input is received.

3. The system as claimed in claim 1, wherein the at least one processor is configured to allow the light device to be controlled according to the determined light setting upon receiving input indicative of expiry of a timer.

4. The system as claimed in claim 1, wherein the lighting control interface comprises a light switch.

5. The system as claimed in claim 1, wherein the at least one processor is configured to adapt the lighting control interface upon determining that the user is present at the location.

6. The system as claimed in claim 5, wherein the system comprises a mobile device, the at least one output interface comprises a display of the mobile device and the lighting control interface comprises a user interface displayed on the display of the mobile device.

7. The system as claimed in claim 1, wherein the at least one processor is configured to adapt the lighting control interface to allow the light device to be controlled according to the determined light setting upon receiving input from a presence sensor indicating that the presence sensor has detected presence in the location.

8. The system as claimed in claim 7, wherein the at least one processor is configured to identify the user while receiving the signal indicative of the conversational input and adapt the lighting control interface to allow the light device to be controlled according to the determined light setting in response to the presence sensor detecting presence of the user in the location.

9. The system as claimed in claim 1, wherein the at least one processor is configured to determine a plurality of candidate locations based on the signal indicative of the conversational input and select the location from the plurality of candidate locations based on an identity of the user, a location of the user when the signal indicative of conversational input was received and/or a history of light setting activations stored in a memory.

10. The system as claimed in claim 1, wherein the at least one processor is configured to determine a plurality of candidate activities and associated probabilities based on the signal indicative of the conversational input and select the activity from the plurality of candidate activities based on the associated probabilities.

11. The system as claimed in claim 1, wherein the signal indicative of the conversational input comprises an audio signal or text.

12. The system as claimed in claim 1, wherein the interface device comprises at least one of a light switch device and/or a presence sensor device.

13. A method of adapting a lighting control interface, the method comprising:

receiving a signal indicative of conversational input from a user;

analyzing the conversational input;

determining an activity and a location based on the analysis, wherein the location is determined at least in part from the activity;

selecting a stored activity matching the activity from a plurality of activities stored in a memory, each of the plurality of activities being associated with a light setting;

obtaining the light setting associated with the selected activity;

identifying a light device at the determined location; and adapting the lighting control interface able to control the light device, to allow the light device at the location to be controlled according to the determined light setting in response to receiving an input via the lighting control interface, wherein the input is a user input or a sensor input.

14. A non-transitory computer reader medium comprising computer executable instructions that when executed, perform at least the method as defined in claim 13.

* * * * *